(No Model.)

J. B. CARROLL.
SINK TRAP.

No. 460,557. Patented Oct. 6, 1891.

Section 1-1.

WITNESSES:
John W. Fisher.
Walter Melius

INVENTOR,
John Ballard Carroll
BY
Robert W. Hardie
ATTORNEY.

UNITED STATES PATENT OFFICE.

JOHN BALLARD CARROLL, OF ALBANY, NEW YORK.

SINK-TRAP.

SPECIFICATION forming part of Letters Patent No. 460,557, dated October 6, 1891.

Application filed January 14, 1891. Serial No. 377,783. (No model.)

*To all whom it may concern:*

Be it known that I, JOHN BALLARD CARROLL, a citizen of the United States, residing at Albany, in the county of Albany and State of New York, have invented certain new and useful Improvements in Sink-Traps; and I do hereby declare the following to be a full, clear, and exact description of the invention, such as will enable others skilled in the art to which it appertains to make and use the same.

My invention relates to improvements in traps adapted to be attached to a waste-pipe leading from a sink or other similar receptacle, and has for its object to provide means for preventing sewer-gas and other obnoxious vapors from passing up through the waste-pipe and out of the sink. This I accomplish by means of an outer chamber having a detachable cap provided with an inlet-pipe extending down below the inner face of the cap, and an inner water-chamber having outlet-ports arranged alternately with wall portions, the ports and wall portions being above the lower end of the inlet-pipe. These means are illustrated in the accompanying drawings, in which—

Figure 1:
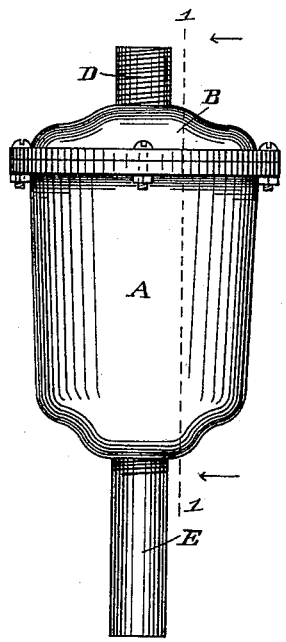
Figure 2:
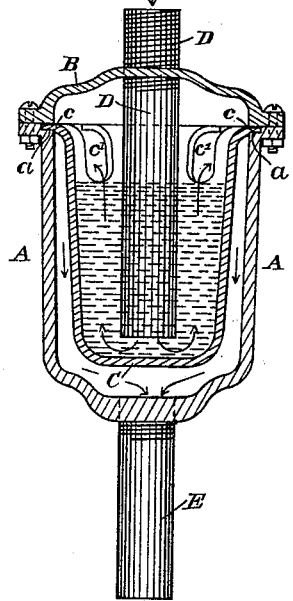
Figure 3:
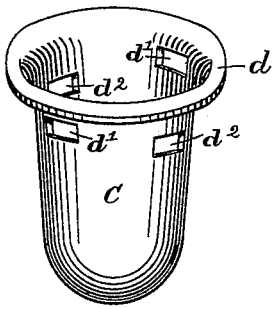
Figure 4:
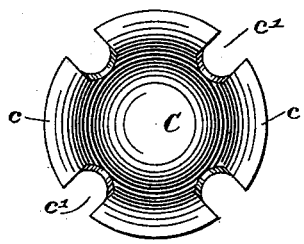

Figure 1 is a side view of a trap embodying my invention. Fig. 2 is a vertical cross-section of the same, taken on line 1 1 of Fig. 1. Fig. 3 is a perspective view of a modification of water-chamber. Fig. 4 is a plan view of water-chamber.

As illustrated in the drawings, A represents an outer or main chamber, having an outlet-pipe E connected therewith. The upper edge of the chamber is preferably provided with a circular recess $a$, adapted to sustain the laterally-extending edge or lips of the water-chamber C. The upper portion of the chamber C is provided with outlet-ports $c'$, opening into the outer or main chamber A. For convenience in manufacturing these outlet-ports are formed so as to extend through the upper cylindrical part of the chamber C and also through the laterally-extending lips or rim $c$, thereby dispensing with a core in molding. The wall portions of said chamber C between the outlet-ports $c'$ are left closed, so that when the water passes out of the chamber it will flow in separate streams, and the air which is in the space between the outer chamber A and the inner chamber C may pass upward in the spaces between the streams, as through a valve, and after rising above the surface of the outgoing water enter into the upper portion of the water-chamber C through the upper portion of the outlet-ports $c'$, and, remaining there, it prevents a vacuum being formed and the consequent siphoning of the water forming the seal. The area of the outlet-ports $c'$ is made considerably larger than the area of the inlet-pipe D, so that said ports serve not only as outlet-ports for the water, but their upper portions also serve as inlet-ports to allow air to pass from the outer to the inner chamber. The construction of the upper portion of said chamber C and the outlet-ports may be varied, however, without departing from my invention, and in some instances I prefer to construct said chamber with two series of ports, one series above the other, as represented by $d'$ and $d^2$ in Fig. 3.

In all of the constructions contemplated by me the total area of the outlet-ports is made greater than the area of the inlet-pipe D, so that the water may pass out of the chamber C as rapidly as it enters said chamber, and the inner water-chamber C is supported by its upper edge, so that the space between the chambers will be free from obstruction of any kind, thereby insuring a free passage to all foreign matter which the outlet-ports have permitted to pass through.

A cap B is secured to the upper edge of the main chamber A, the joint between said cap and chamber being the ordinary ground joint or a composition joint made of any suitable substance adapted to prevent gas from passing through the same. The cap B is detachably secured to the upper edge of the chamber A in the manner shown for the purpose of enabling the inner chamber C to be readily inspected and cleaned in case the ports should become choked with impassable matter. The inner surface of the cap is preferably made concave, so as to form an air-chamber above the outlet-ports.

An inlet-pipe D extends through the cap B and down into the lower portion of the chamber C below the outlet-ports.

When the trap is in use, the waste water passes through the pipe D into the water-chamber C, and when said chamber becomes filled up to the level of the outlet-ports the water thus retained serves as a seal and effectually prevents any gases from passing from the pipe E up through the pipe D, while the outlet-ports permit a continuous flow of water from the chamber C into the outer chamber A and from thence through the pipe E.

The water forming the seal in sink-traps frequently becomes siphoned out of the chamber and the seal broken in consequence of a vacuum being created in the water-chamber. In my device, however, such a result is impossible, for the reason that an air-chamber is formed by the concaved face of the cap above the outlet-ports, and also by the space between the water-chamber C and the outer chamber A. The area of the outlet-ports being greater than the area of the inlet-pipe D, it is not possible for the outlet-ports to become completely filled by the passing water, and some space will be left at all times for the gases or air in the space between the chambers C and A to pass up between the outgoing streams of water and through the outlet-ports into the air-chamber formed by the concaved face of the top B.

When the construction illustrated in Fig. 3 is used, the water cannot rise above the lower series of ports $d^2$, and the upper series of ports $d'$ serve to allow the air or gases which have accumulated in the space between the chambers A and C to pass into the air-chamber formed in the cap B. The area of the lower ports $d^2$ is made large enough to allow all the water to pass through without the aid of the upper ports for the purpose above mentioned.

What I claim is—

1. The combination, with an outer chamber or a shell provided on its lower end with an outlet-pipe, of a detachable cap for said chamber provided with an inlet-pipe extending below the inner face of said cap, and an inner water-chamber provided with alternate outlet-ports, and intervening wall portions arranged above the lower end of the inlet-pipe, the combined areas of said outlet-ports being greater than the area of the inlet-pipe, substantially as shown and described.

2. The combination of an outer chamber having a detachable cap provided with an inlet-pipe extending below its inner face, and a water-chamber supported at its upper end by said outer chamber and provided with outlet-ports arranged in two series, one higher than the other, both of said series being arranged below the line of suspension of the chamber and above the lower end of the inlet-pipe, substantially as shown and described.

In testimony whereof I affix my signature in presence of two witnesses.

JOHN BALLARD CARROLL.

Witnesses:
 ROBERT W. HARDIE,
 CHAS. H. MILLS.